United States Patent [19]

Edwards

[11] 4,146,970
[45] Apr. 3, 1979

[54] REMOTE-INDICATING MAGNETIC COMPASS

[76] Inventor: Robert A. Edwards, 12 Notch Park Rd., Little Falls, N.J. 07424

[21] Appl. No.: 428,460

[22] Filed: Dec. 26, 1973

[51] Int. Cl.² .......................................... G01C 17/26
[52] U.S. Cl. ............................. 33/363 K; 250/231 SE
[58] Field of Search ................. 33/363 K, 363 R, 312, 33/361, 366, 362, 356, 317, 325; 250/231 R, 231 SE, 237; 340/201 P, 27 NA; 324/175

[56] References Cited

U.S. PATENT DOCUMENTS

| 2,238,867 | 4/1941  | Carter ............................ 33/358      |
| 2,316,411 | 4/1943  | Finnegan ...................... 33/363 R       |
| 2,370,000 | 2/1945  | Best .............................. 33/363 K    |
| 3,234,394 | 2/1966  | Worden ........................ 250/231 SE     |
| 3,349,406 | 10/1967 | Perry et al. .................. 33/363 K       |
| 3,376,452 | 4/1968  | Lally ............................ 340/324 R    |
| 3,396,378 | 8/1968  | Keith ........................... 340/324 R     |
| 3,736,559 | 5/1973  | Trageser et al. ............. 340/27 R         |
| 3,772,503 | 11/1973 | Fowler ......................... 33/363 K       |
| 3,800,204 | 3/1974  | Kenney ........................ 250/231 SE     |

Primary Examiner—Richard E. Aegerter
Assistant Examiner—John W. Shepperd

[57] ABSTRACT

A remote-indicating magnetic compass system for use with automobiles or the like. The system consists of a dashboard-mounted readout unit, which receives and decodes logic signals provided thereto from a remotely located electro-optical shaft encoder, the latter being responsive to and positioned by the earth's magnetic field. The form of bearing readout is discrete rather than continuous, e. g. 8 or 16 bearing states are described. The bearing readout display may be defined by a plurality of discrete indicators, such as light-emitting diodes, or segmented alpha indicators or so forth may be employed. The electro-optical shaft encoder assembly is preferably located at a point on the vehicle distant from large bodies of iron or steel, and where the earth's field is strong relative to fields associated with permanently magnetized auto parts.

2 Claims, 10 Drawing Figures

FIG. 1
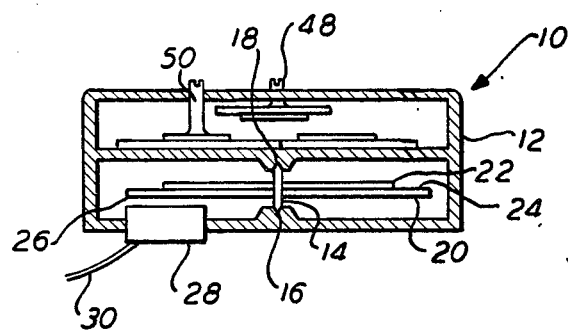
FIG. 2
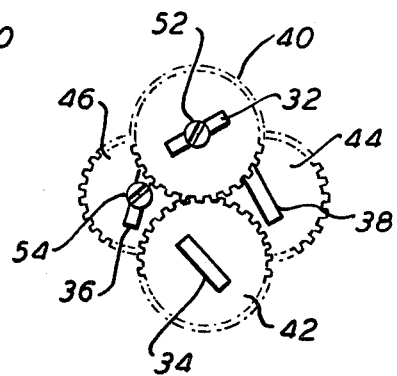
FIG. 3
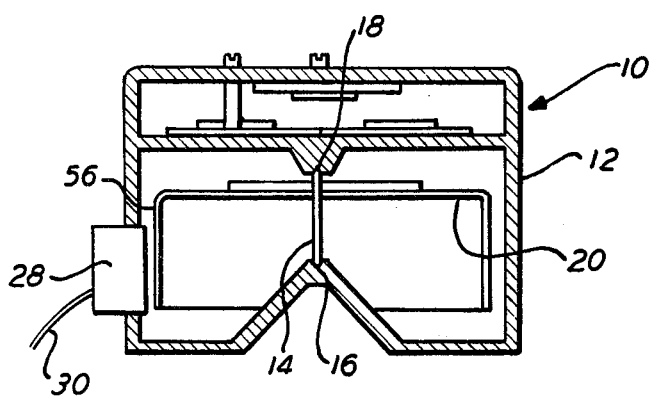
FIG. 4
FIG. 5
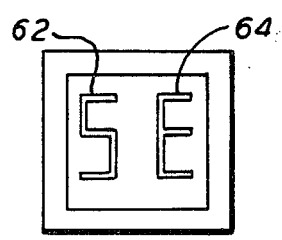

REMOTE-INDICATING MAGNETIC COMPASS

BACKGROUND OF INVENTION

This invention relates generally to remote indicating magnetic compasses, and more specifically relates to a compass system for providing discrete bearing information at a visually accessible point on an auto dashboard.

Up until the present time, auto compasses have largely been regarded as accessories that are purchased by motorists subsequent to, and separate from the automobile itself. These prior art accessories commonly, for example, are attached to auto windshields or dashboards by means of a suction cup, or by other means. The mounting location is selected as remote as possible from magnetic material, and compensation adjustments may be present which can be manipulated after the compass is installed. These prior installations are in point of fact, unattractive, undependable, and makeshift. They usually are not lighted since carrying wires to the unit from the dashboard requires drilling holes through the dashboard to make an electrical connection. Some units do carry batteries and ON-OFF switch for momentary night viewing, but, as is so with flashlights, the batteries are usually discharged when called upon for service. In consequence of the foregoing factors, it may be observed that present auto compasses are by and large of but limited utility, and indeed tend to be treated by the public, more as a novelty item or conversation piece — than as valuable aid to the motorist.

In the past, several basic forms of transmitting (remote-indicating) compasses have been developed and described. Reference may be had in this connection, for example, to the treatise MAGNETIC COMPASSES AND MAGNETOMETERS by Alfred Hine, University of Toronto Press, Toronto, Canada (1968). Among other systems described therein, are those which derive a signal from a master compass via magnetic coupling, capacitive coupling, resistance coupling, and photo-electric coupling to discs driven by the master compass. All these reported systems are designed to position a repeater compass needle to precisely correspond to the needle position of the master unit, using either open loop or closed loop servo-control techniques. These compasses are, however, high cost precision instruments, not intended or practical for use in auto installations.

In the last-mentioned connection, it is important to appreciate an understanding of the instant invention, that the function of a compass in an automobile installation is distinct from the function performed by a compass in aircraft or marine vessels. In the latter two environments, the instruments are called upon to provide precise bearings, which are absolutely essential for navigation purposes. In the case of the automobile, however, the motorist does not rely upon the compass for precise navigation. On the contrary, the motorist is obliged to follow a road which may meander in various directions. As he proceeds his interest is not, therefore, one in knowing a precise bearing in exact degrees at all times; but rather is one of having sound information regarding his general direction of progression. This in order that he might assure himself that he is proceeding generally where he wishes to go, and also so that he may appropriately alter his course upon unmarked roads or so forth, and yet be assured of his general direction of advance.

In accordance with the foregoing, it may be regarded as an object of the present invention, to provide a magnetic compass system for use in automobiles, which is accurate and dependable, and which is adapted for direct installation on dashboard or the like, whereby such instrument may be readily provided as a factory option at time of automobile assembly.

It is a further object of the present invention, to provide a magnetic compass system, adapted for installation on dashboards of automobiles or the like, which is so constructed as to enable minimization of the magnetic effects induced on the compass by masses of ferromagnetic material in the automobile.

It is a still further object of the present invention, to provide a magnetic compass system for use in automobiles, which includes a dashboard-mounted bearing indicator, provided with illuminated visual displays; which displays further may be in discrete form indicative of the direction of vehicle progression.

SUMMARY OF INVENTION

Now in accordance with the present invention, the foregoing objects, and others as will become apparent in the course of the ensuing specification, are achieved in a magnetic compass system comprising two basic components: a magnetic compass-shaft encoder sub-assembly; and a bearing indicator readout unit. The compass-shaft encoder sub-assembly may comprise a magnetic bar or bars mounted to a flat or cup-shaped circular disc. The center of the disc is fixed to an axle, the ends of which are mounted in pivot bearings to allow the magnet disc to rotate and position itself with respect to the earth's magnetic field. The pivot bearings are attached to a support housing, which also supports bar magnets that can be positioned by adjustable screws to cancel out spurious magnetic fields caused by the permanent magnetization of the vehicle on which the instrument is installed.

The shaft encoder is comprised of alternate reflective and non-reflective circular sections on the circular disc, which modulate light sources, as viewed by photo-transistors mounted to the support housing. The photo-transistor outputs produce codes at logic voltage levels which determine compass shaft position. The compass shaft encoder sub-assembly is mounted out of sight, as remote as possible from concentrations of ferromagnetic materials, and from spurious fields.

The bearing indicator readout unit receives the coded logic signals from the photo-transistors through a cable, decodes same and produces a visual display of magnetic heading. Performance of the bearing indicator is unrelated to the presence of magnetic fields or materials; hence it can be placed next to or integrated with other dashboard instruments.

Bearing indicator readout resolution is determined by the number of positions the shaft encoder can define, as well as by the number of positions the indicator can display. The number of photo-transistors required by the shaft encoder to obtain a given resolution can be minimized by utilizing binary coding. This, however, requires that the bearing indicator readout unit include decoder logic, in addition to readout display means.

BRIEF DESCRIPTION OF DRAWINGS

The invention is diagrammatically illustrated by way of example, in the drawings appended hereto, in which:

FIG. 1 is a longitudinal cross-section through a magnetic compass-encoder sub-assembly, using a flat circular disc form of code wheel.

FIG. 2 is a plan view of the compensation magnet mechanism present in the FIG. 1 sub-assembly.

FIG. 3 is a longitudinal cross-sectional view through a magnetic compass-encoder sub-assembly, utilizing a cup-shaped circular disc form of code wheel.

FIG. 4 is a plan view of an eight state direction display device, utilizable with the present system.

FIG. 5 shows a plan view of a further display device.

DESCRIPTION OF PREFERRED EMBODIMENTS

Figure 6:
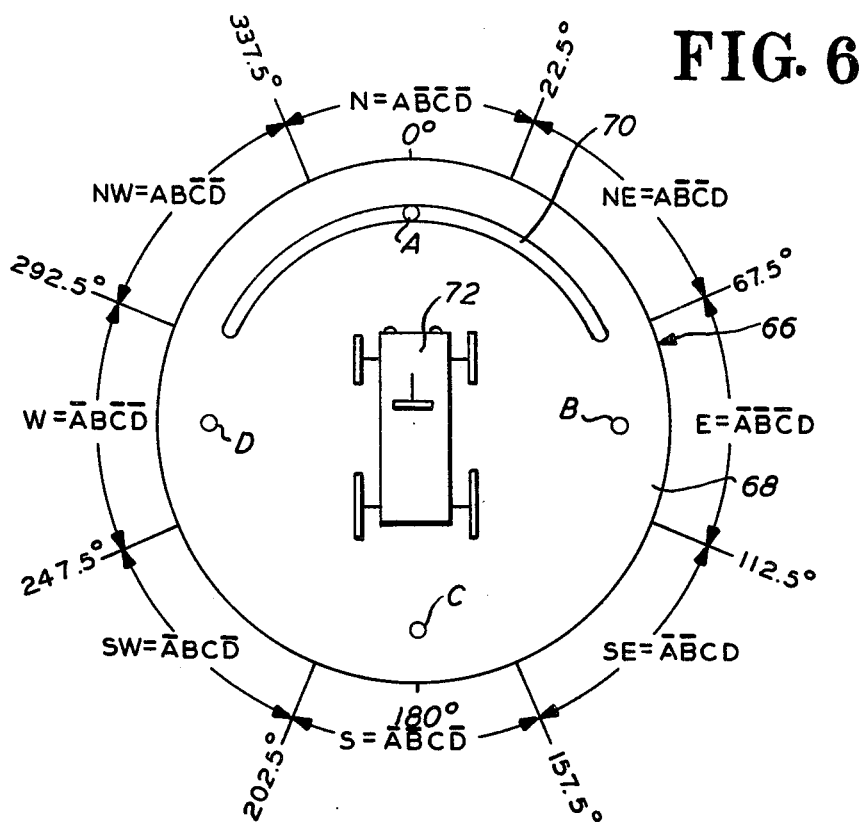
FIG. 6 is a plan view of an encoding wheel utilizable with the sub-assembly of FIG. 1.

In FIG. 1 a longitudinal cross-section appears through a magnetic compass-encoder sub-assembly 10, forming part of a compass system in accordance with the present invention. Sub-assembly 10 includes those elements which respond to the incident magnetic field of the earth. Accordingly the said sub-assembly is secured to an automobile at a point relatively spaced from and unshielded by masses of ferromagnetic material.

Sub-assembly 10 includes a housing 12, in which is mounted an axle 14, the latter being freely rotatable at opposed pivot bearings 16 and 18. An encoding wheel 20 rotates with axle 14 and carries a permanent magnet 22 on its upper face 24, which thus permits the wheel 20 to be oriented by the earth's magnetic field. The lower face 26 of wheel 20 is opposed to and spaced from a detector block 28 which is optically coupled to wheel 20 as to determine the angular position thereof. Signals indicative of such angular position are transmitted through a cable 30 to a bearing indicator readout unit mounted, remotely, at the dashboard of the automobile.

In order to permit compensation for the ferromagnetic materials present in the vehicle, pairs of opposed permanent magnets, as at 32, 34 and at 36, 38 (FIG. 2) are mounted to gears 40, 42, 44 & 46. The gears 40 and 42 are meshed with one another, as are the gears 44 and 46. Shafts 48 and 50 extend respectively from gears 40 and 46, and are slotted at their distal ends 52 and 54 which extend outside housing 12. By means of a screwdriver inserted at such distal ends, one may accordingly manipulate the opposed gears as to more or less oppose magnets (such as 32, 34) to one another, and thereby to a desired degree, null incident spurious fields.

The mechanism of optical coupling referred to above, will be further described hereinbelow. It may be noted generally, however, that such coupling is typically brought about via reflective arcs provided on face 26 of wheel 29, which arcs reflect light beams generated at block 28 for receipt by receptors in the said block. Since in this type of arrangement inner arcs are necessarily of more limited extension than outer arcs, resolution yielded by the detector block 28 can, in some instances, be improved by utilizing a geometry such as that in FIG. 3. The elements of this Figure are identified by reference numerals in correspondence to the elements of FIG. 1. It will be noted, however, that the encoding wheel 20 is now cup-shaped, whereby the rim 56 is opposed to detector block 28 — with which it is optically coupled. In this type of arrangement, it will be evident that parallel reflective stripes extending along the rim (perpendicular to the plane of the drawing) may in each instance utilize equal available space.

While such is not explicitly shown in the foregoing Figures, a transparent viscous fluid may be provided within housing 12 — as is generally known in the art of constructing magnetic compasses. Such fluid may provide damping, and also serves to reduce the effective weight of the encoding wheel 20 and to lubricate the pivot bearings 16 and 18.

FIG. 4 is a plan view of a bearing display device 58 which may form part of the readout unit connected to cable 30 of FIG. 1. Device 58 is an 8-state indicator which preferably is part of the dashboard instrument cluster in the automobile. Device 58 may, however, even comprise (together with a casing or so forth) a separate unit mountable as desired at or adjacent the vehicle dashboard. Depending upon the angular position of axle 14 one or another of the states "N", "NE", "E", "SE", etc. will be illuminated by discrete lamps (including e.g. light-emitting diodes) which underlie the appropriate designation. Another form of 8-state display device 60 is seen in FIG. 5. In this instance a pair of segmented lamps 62, 64 comprise the display. These lamps are well-known devices, a type, for example, being available from Hewlett-Packard Corp. By illuminating selected segments of the lamps, characters are formed to display the desired state (e.g. "NE", "N", etc.).

Many variations upon the display devices described are, of course, possible. For example, discrete state displays of the general type indicated may be combined with other instruments on the instrument cluster of the automobile, as for example, with a speedometer, a clock or so forth. Some of these further arrangements will be illustrated in the further Figures now to be described. The significant point for present purposes, however, is that in accordance with the invention, discrete states are displayed as opposed to a continuous representation. As thus far illustrated, an 8-state capability is deemed preferable, since this is about the practical limit of interest for a motorist: where fewer states are present the compass indications begin to lose value (particularly when the user is making his way by secondary or other roads not evident on a map); and where more than eight states are described, confusion as opposed to clarification is likely to result, particularly if the motorist is not skilled in the use of maps, compasses and the like. In this same connection, however, it should be kept in mind that the invention is fully applicable to providing a 4-state (N, E, S, W) output, a 16-state output, etc.

In FIG. 6 a plan view appears of an encoding wheel 66 utilizable as the wheel 20 of FIG. 1. The face 68 of wheel 66 may be regarded as that which is optically linked to block 28. Block 28, in the present instance, however, may not take the simple unit form shown in FIG. 1, but rather must include four-light source-sensor pairs spaced about the wheel — as will shortly be seen. In particular, the face 68 while being generally nonreflective, includes a reflective zone in the form of a single arc 70 of silver or other light reflective material, which arc extends of the order of 135° about the wheel. Projected onto the face 68 are a sequence of four circles "A", "B", "C", and "D". These represent the points at which the light path between pairs of light sensors and photo-receptors impinges on face 68 — as will be better seen in FIG. 8 where such a pair is seen e.g. at 108 and 118. For present purposes the important point to note is that a particular light path will only be completed when the reflective arc 70 underlies the associated circle "A", "B", etc. Although one riding in the automobile would probably feel otherwise, an analysis of FIG. 6 is best yielded by appreciating that wheel 66 remains stationary with respect to the earth's magnetic field as the vehicle — schematically superimposed at 72 — turns with respect to the wheel 66, and carries the light-source sensor pairs with it. Adopting a convention to be used throughout this specification, we may denote the output from the sensor as "0" when the reflected path is completed, and "1" otherwise. Using this terminology, the individual sensors associated with the several light paths have outputs such as A or Ā, B or B̄, etc., where the output is A where the light path is completed by reflection, Ā otherwise, etc. As the vehicle 72 thus pivots, the sensor outputs are as set forth for the eight directional states depicted about the periphery of wheel 66. It will, of course, be evident that these outputs are simple 4-bit codes, which may be readily translated to enable display of the specific directional state with which they are associated.

Figure 7:
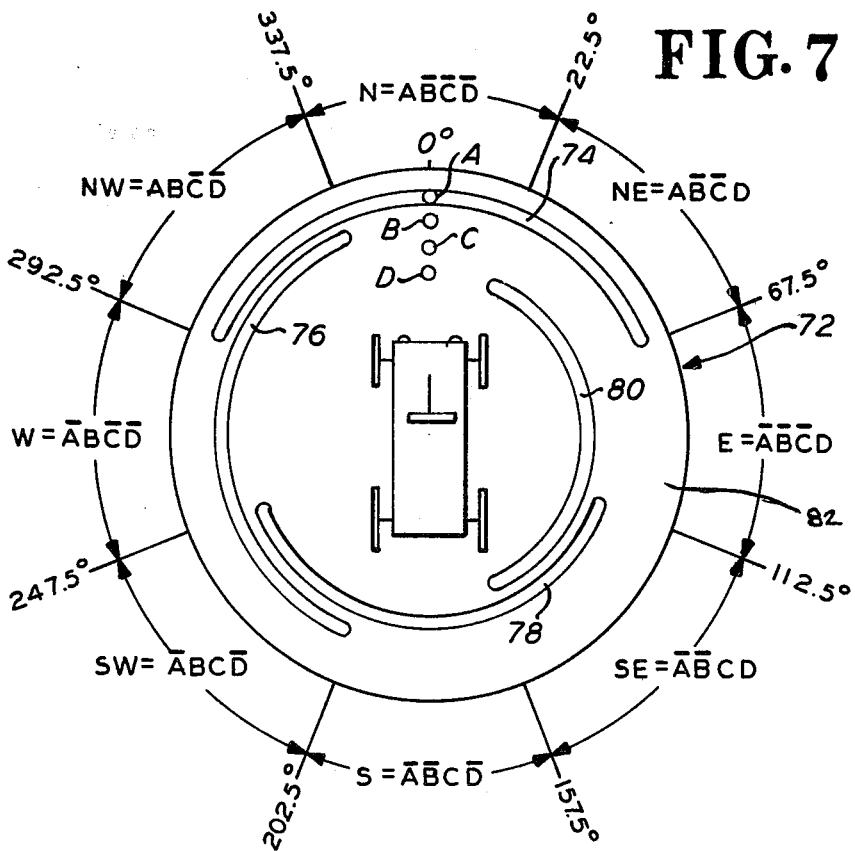
FIG. 7 is a plan view of a further encoding wheel utilizable with apparatus of the type shown in FIG. 1.

As already indicated, the encoding wheel arrangement of FIG. 6 has the disadvantage of requiring the light source-sensor pairs to be spaced 90° apart, in consequence of which it is difficult to fabricate the several pairs as a single integrated unit. Installing the several pairs at four different, physically separated points about wheel 66, is furthermore a difficult and relatively expensive operation. A modification of the wheel which obviates these problems is seen in FIG. 7. The various notation and scheme of depiction in this Figure is identical to that of FIG. 6. The wheel 72 is now seen, however, to include four 135° reflective arcs, 74, 76, 78 and 80, each said arc lying at a different radial position, and the arcs being angularly staggered with respect to one another about the wheel periphery. The light paths as intercepted by face 82 of wheel 72 are again designated at A, B, C and D. It is seen now, however, that the arrangement depicted permits the light source-sensor pairs associated with each light path to be closely adjacent each other, whereby a compact integrated unit — such as that depicted at block 28 in FIG. 1 may be used. Another point that may be noted in the FIG. 7 embodiment (by comparing the bit outputs for the discrete angular states) is that as the auto rotates only one bit transition occurs at any particular time. In consequence even though a finite number of degrees are required to go from a logic 1 to a logic 0, the worst effect as far as readout is concerned is a wavering of position on the indicator from, say, NE to N, as opposed to wilder variations which could occur with certain other arrangements.

Figure 8:
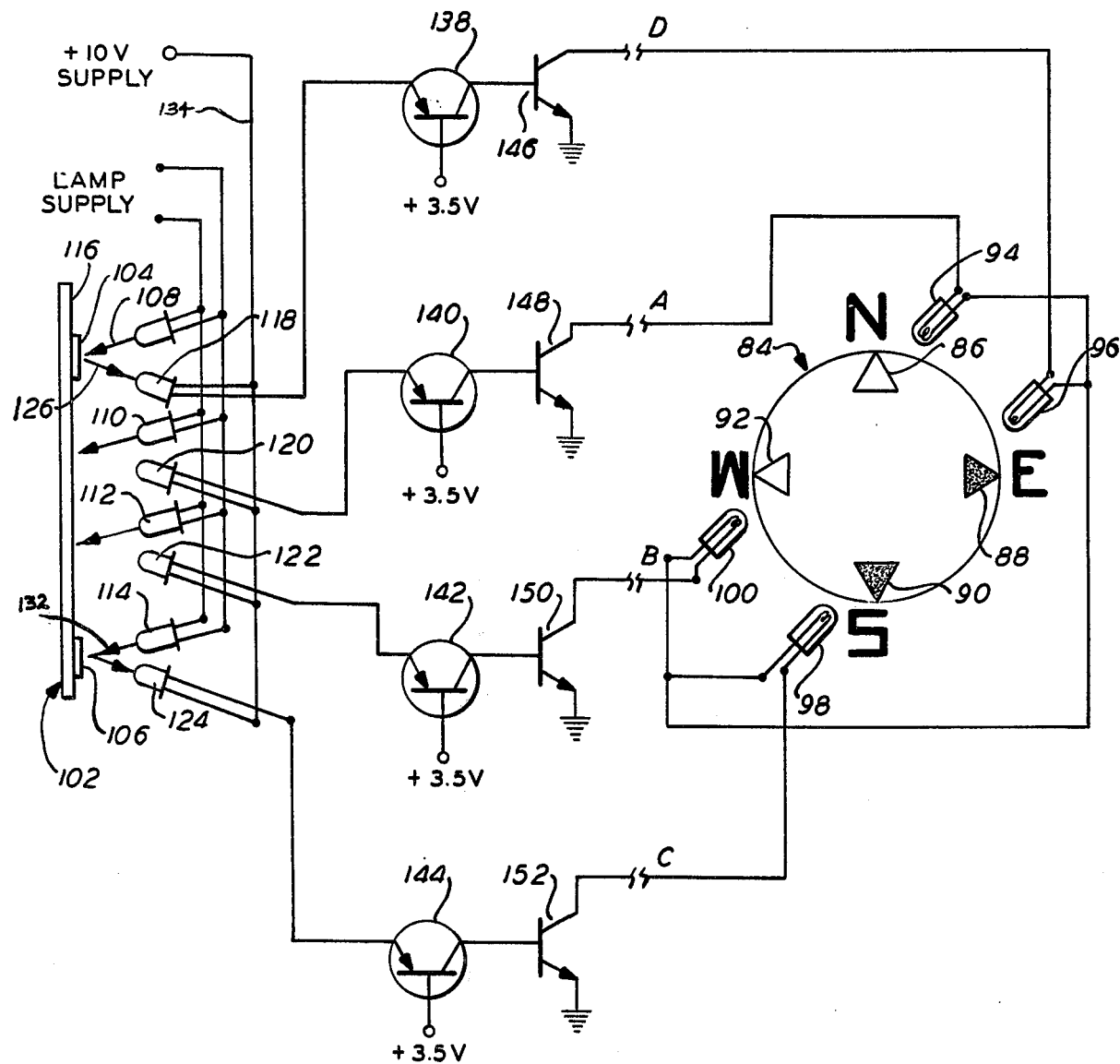
FIG. 8 is a simplified electrical schematic diagram illustrating the manner in which an encoding wheel of the type appearing in FIGS. 6 or 7 may be utilized to provide outputs for an eight state discrete display.

In FIG. 8, a simplified electrical schematic diagram appears, illustrating the manner in which an encoding wheel of the type appearing in FIGS. 6 and 7, may be utilized to provide outputs for an 8-state discrete display. Initially it may be noted in the Figure, that the dashboard mountable display 84 comprises a circular dial including four illuminatable indicators 86, 88, 90 and 92, which indicators may be lit along with the associated cardinal direction N, E, S or W by lamps 94, 96, 98 and 100. The type of display shown enables 8-states to be recognized: e.g. N or S by lighting, respectively, of lamp 94 or 98; and similarly the direction NE (or so forth) may be displayed by lighting both lamps 94 and 96.

An encoding wheel 102 of the type heretofore discussed is seen in edge view, such wheel including light reflective arcs as at 104 and 106. Four light sources 108, 110, 112 and 114 preferably LED'S, are spaced from the face 116 of wheel 102, and are positioned with respect to four photo-receptors 118, 120, 122 and 124, preferably photo-diodes, such that a completed light path (via the reflective arcs) is enabled, as at path 126 where the associated reflective arc underlies a light source-photo-receptor pair. In the position shown, therefore, only the light paths 126 and 128 are thus completed — the associated reflective arcs do not underlie the pairs 110-120 or 112-122. Lamps 94 through 100 are supplied with required potential via the pair of lines 130 and 132.

Each of the photo-receptors 118 through 124 receives a D.C. input via power line 134. The outputs from these photo-receptors are provided to the emitters of PNP transistors 138, 140, 142 and 144. These transistors, in turn, provide base drive for transistors 146, 148, 150 and 152, which when turned on light lamps 94 through 100. It will thus be evident that in the particular state of affairs illustrated in the Figure, both lamps 96 and 98 are enabled — to indicate a SE heading.

Figure 9:
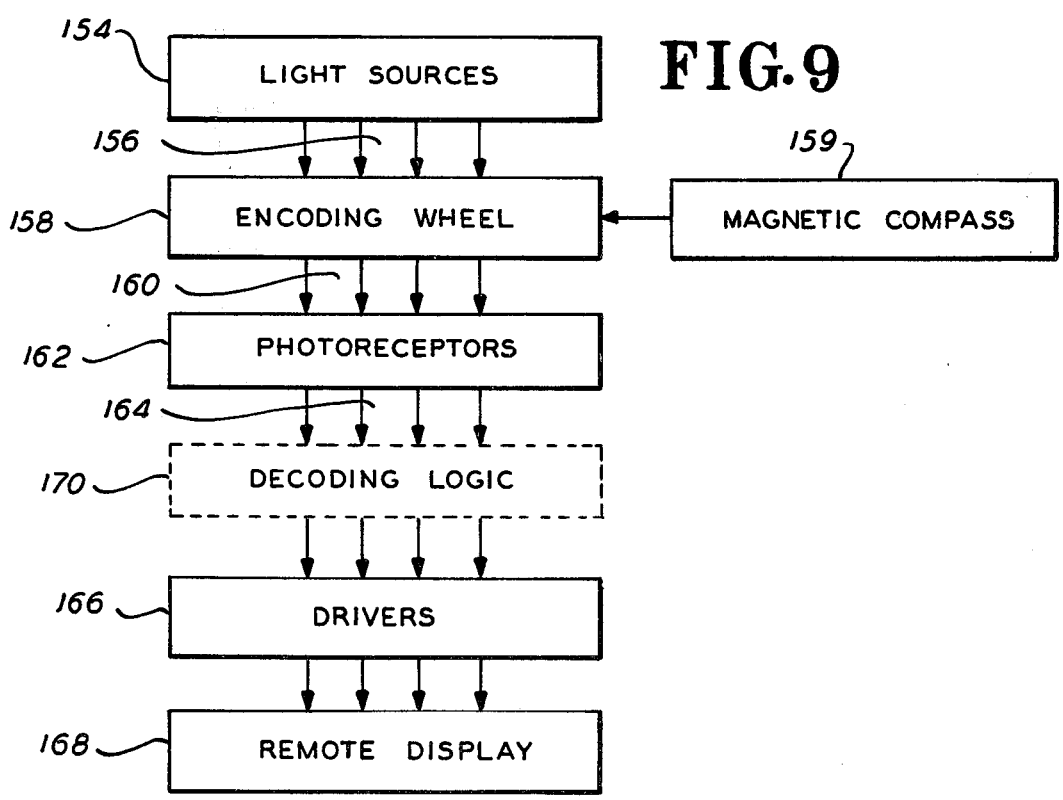
FIG. 9 is a simplified block diagram illustrating the general technique by which a display is enabled in the present invention.

It will be evident from the foregoing, that the general mode of operation of the instant invention is as is schematically depicted in FIG. 9. As thus seen therein a plurality of light sources 154 provide outputs 156 which are modulated by encoding wheel 158, which is positioned by magnetic compass 159, and determines the form of parallel outputs 160 to a plurality of photo-receptors 162. The photo-receptor outputs 164 enable drivers 166 for lamps or the like at the remote display 168. In the simplest instance the photo-receptors 162 may provide outputs directly to the drivers for individual lamps, but in the more general case decoding logic 170 may be provided — such being particularly useful in removing ambiguities. The latter phenomenon may, for example, occur when adjacent directional states on the encoding wheel are characterized by multiple changes in the bit outputs associated with the respective states.

Ambiguities caused by the occurrence of simultaneous transitions, and the logic required to overcome the effects, can be eliminated by selecting arc positions for the encoding wheel, which while generating binary codes, do not cause more than a single transition to occur at any one time.

Figure 10:
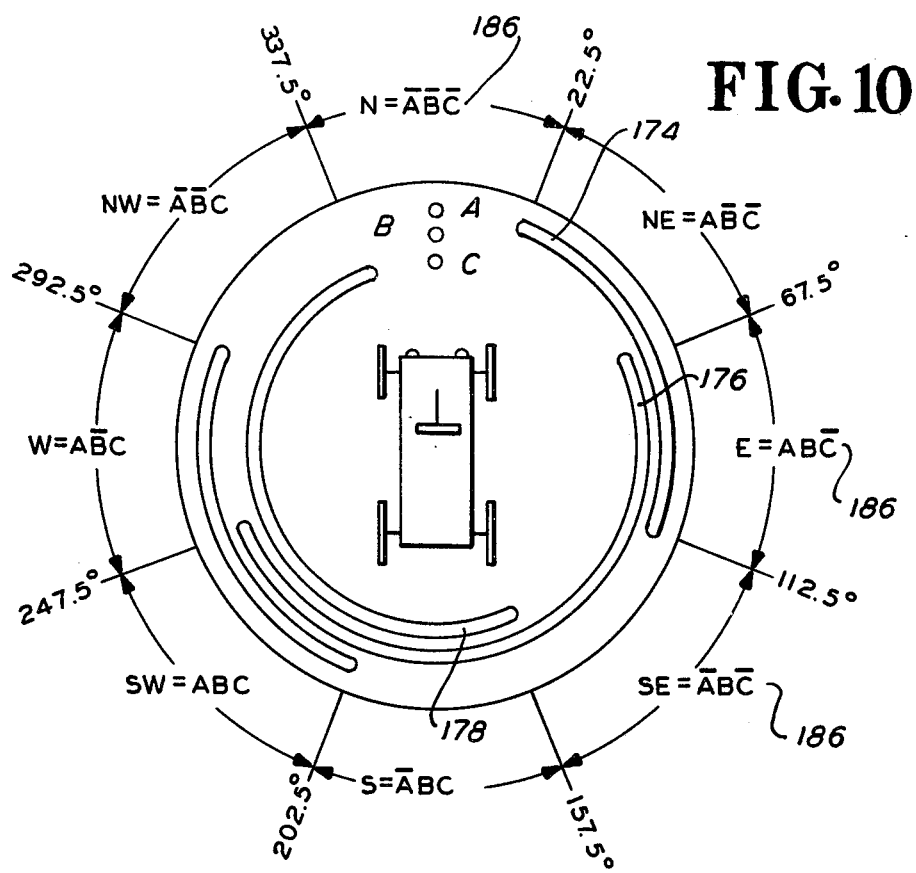
FIG. 10 is a plan view of a code wheel which provides a 3-bit binary coded output, and which eliminates transition ambiguities.

FIG. 10 is a plan view, similar to FIGS. 6 and 7, of an encoding wheel 172 which is effective in eliminating the aforementioned ambiguity problem. The notations and other terminology appearing in FIG. 10 are identical with the conventions described in connection with FIGS. 6 and 7. In particular, three reflective arcs 174, 176 and 178 are provided, which are located in relation to the projected light paths A, B and C (each associated with a light source — photo-receptor pair as in e.g. FIG. 8) as to produce the 3-bit binary codes 186, indicative of auto heading. This arrangement is seen to produce eight discrete states of output logic levels, while at the same time requiring only one logic level change at a time as heading angle is rotated through 360°. This arrangement assures that, at points of arc transition, the decoded bearing can (at worst) vascillate only between adjacent headings, i.e. N, NE, etc. The coded outputs provided may be processed by conventional logic circuitry, as is generally shown in FIG. 9, to yield outputs for enabling the associated state to be displayed.

While the present invention has been particularly set forth in terms of specific embodiments thereof, it will be understood in view of the instant disclosure, that numerous variations upon the invention are now enabled to those skilled in the art, which variations yet reside within the scope of the instant teaching. Accordingly the invention is to be broadly construed, and limited only by the scope and spirit of the claims now appended hereto.

I claim:

1. A remote-indicating magnetic compass system for use by the general public in automobiles or the like comprising:
   a housing;
   a transparent viscous damping fluid filling said housing a compass magnet;
   means rotatably mounting the magnet in the housing for response to the incident magnetic field of the earth;
   compensation magnets in the vicinity of the compass for imposing an additional magnetic field to compensate for magnetic fields produced by an automobile; an encoder coupled to the compass magnet having a single light modulating arc; a continuous light source adjacent said encoder to illuminate said arc;
   phototransistors arranged equally spaced on a circle parallel to the circle traversed by said arc such that single or adjacent pairs of phototransistors are illuminated by said light modulating arc; light annunciators corresponding to the number of phototransistor mounted to a map scale to indicate auto heading relative to map letters N. W. W. E. and; electric means directly connecting each phototransistor to a single light annunciator.

2. A remote-indicating magnetic compass system for use by the general public in automobiles or the like comprising;
   a housing;
   a transparent viscous damping fluid filling said housing;
   a compass magnet;
   means rotatably mounting the compass magnet in said housing for response to the incident magnetic fluid of the earth;
   compensation magnets in the vicinity of said compass magnet for imposing an additional magnetic field to compensate for spurious magnetic fields produced by an automobile;
   an encoder coupled to said compass magnet having a number of staggered arcs at different radial distances;
   a continuous light source adjacent said encoder to illuminate said arcs;
   phototransistor equal in number to the arcs arranged in a cluster such that each phototransistor senses only one arc;
   a light annunciator for each phototransistor the light annunciators being mounted to a map scale to indicate auto heading relative to map letters N. S. E. W. and; electric means directly connecting each phototransistor to its corresponding light annunciator.

* * * * *